United States Patent [19]

Takeda

[11] Patent Number: 5,298,839
[45] Date of Patent: Mar. 29, 1994

[54] ELECTRICAL ANGLE CONTROL SYSTEM FOR A BRUSHLESS DC MOTOR IN A MAGNETIC DISK APPARATUS

[75] Inventor: Kazunori Takeda, Kawasaki, Japan

[73] Assignee: Fujitsu Limited, Japan

[21] Appl. No.: 41,942

[22] Filed: Apr. 2, 1993

Related U.S. Application Data

[63] Continuation of Ser. No. 853,487, Mar. 18, 1992, abandoned.

[30] Foreign Application Priority Data

Mar. 20, 1991 [JP] Japan .................. 3-35425

[51] Int. Cl.$^5$ .................. H02P 6/02; G11B 5/00
[52] U.S. Cl. .................. 318/254; 318/138; 318/431; 369/44.27
[58] Field of Search .................. 318/138, 254, 430, 431, 318/439; 360/71, 73.01, 73.08, 75, 78.04, 78.12, 98.01; 369/44.27, 44.28, 44.29, 44.31

[56] References Cited

U.S. PATENT DOCUMENTS

| 3,706,923 | 12/1972 | Dunfield | 318/254 |
|---|---|---|---|
| 3,883,785 | 5/1975 | Fulcher et al. | 318/254 |
| 3,908,130 | 9/1975 | Lafuze | 318/254 X |
| 4,072,888 | 2/1978 | Bechtle et al. | 318/685 |
| 4,295,085 | 10/1981 | Lafuze | 318/721 |
| 4,644,234 | 2/1987 | Nola | 318/254 |
| 4,710,684 | 12/1987 | Okita et al. | 318/254 |
| 4,763,052 | 8/1988 | Lundin et al. | 318/254 |
| 4,890,174 | 12/1989 | Chalmers et al. | 360/78.12 |
| 4,967,122 | 10/1990 | Rees | 318/254 |
| 5,204,593 | 4/1993 | Ueki | 318/254 |

FOREIGN PATENT DOCUMENTS 55-5013 1/1980 Japan .

Primary Examiner—Bentsu Ro
Attorney, Agent, or Firm—Welsh & Katz, Ltd.

[57] ABSTRACT

In an electrical angle control system for a brushless DC motor having a relatively high counter electromotive voltage, the system includes: a rotor position detection unit mounted to the motor for detecting the rotor position and generating a position detection signal; an electrical angle control unit receiving the position detection signal and controlling period of the position detection signal in such a way that the electrical angle is advanced from the electrical angle of zero degrees during acceleration at the start of rotation to ensure an acceleration characteristic of the motor, and the electrical angle is returned to the electrical angle of zero degrees during normal rotation to ensure a small driving current and reduce the power consumption of the motor; a driving unit receiving position detection signals each having an electrical angle controlled by the electrical angle control unit and outputting the driving current to the motor.

9 Claims, 16 Drawing Sheets

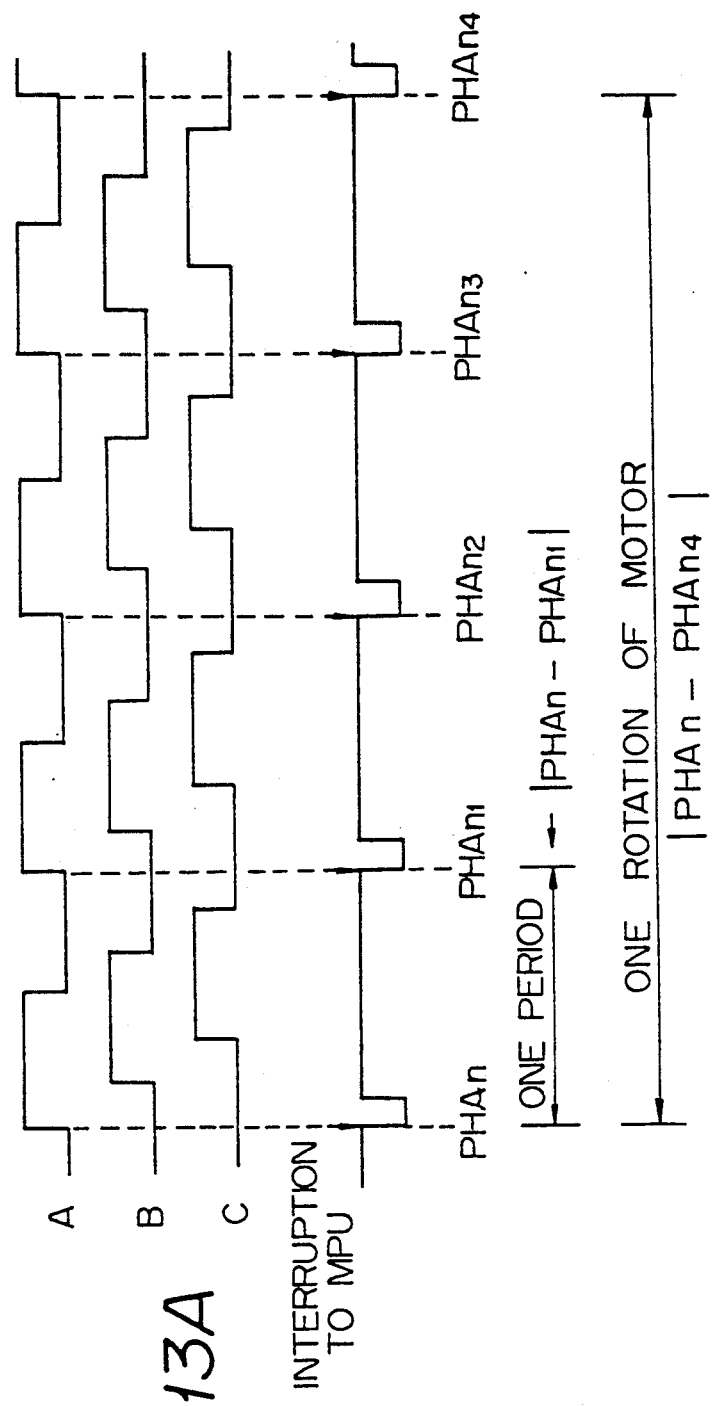

ELECTRICAL ANGLE CONTROL SYSTEM FOR A BRUSHLESS DC MOTOR IN A MAGNETIC DISK APPARATUS

This is a continuation of application Ser. No. 07/853,487, filed Mar. 18, 1992, now abandoned.

BACKGROUND OF THE INVENTION

1. Field of the Invention

The present invention relates to a DC motor control system, particularly, it relates to an electrical angle control system for a brushless DC motor to ensure an acceleration characteristic at the start of rotation and to reduce power consumption of the motor.

2. Description of the Related Art

In general, a DC motor has many merits, for example, a rapid start acceleration, a large start torque, a linear characteristic of rotation for the change in a voltage supply, and a linear characteristic of torque for the change in an input current. Accordingly, the DC motor is widely used in various fields, particularly, as a control motor of an automatic control system based on the above merits.

Further, as is known, a brushless DC motor has an electrical rectification (commutation) circuit instead of a mechanical rectification means, for example, a brush and a commutator. Accordingly, the brushless DC motor has a good noise characteristic because it has no contact portions in the rectification mechanism.

Because of a good noise characteristic the brushless DC motor is also used as a spindle motor for a magnetic disc apparatus. In the magnetic disc apparatus, it is also important to reduce power consumption of the spindle motor.

SUMMARY OF THE INVENTION

The object of the present invention is to provide a brushless DC motor that ensures an acceleration characteristic at the start of rotation and a small driving current to reduce the power consumption of the motor.

In accordance with the present invention, there is provided an electrical angle control system for a brushless DC motor having a relatively high counter electromotive voltage, the system including:

a rotor position detection unit mounted to the motor for detecting the rotor position and generating a position detection signal;

an electrical angle control unit receiving the position detection signal, and controlling the period of the position detection signal in such a way that the electrical angle is advanced from the electrical angle of zero degrees during acceleration at the start of rotation to ensure an acceleration characteristic of the motor, and the electrical angle is returned to the electrical angle of zero degrees during normal rotation to ensure a small driving current to reduce power consumption of the motor; and a driving unit receiving position detection signals each having an electrical angle controlled by the electrical angle control unit, and outputting the driving current to the motor.

In a preferred embodiment, the electrical angle control unit further controls the electrical angle in such a way that, first, the electrical angle is not advanced just after the start rotation, and then the electrical angle is advanced from zero degrees until the rotation becomes normal, and finally, the electrical angle is returned to zero degrees.

In another preferred embodiment, the electrical angle control unit includes: a 16-bit free run counter receiving clocks having one micro-second period, counting the clocks and outputting 16-bits data from "0000" to "ffff"; 16-bit data latch circuits for latching 16-bit data; a 16-bits comparator for comparing 16-bits data from the free run counter with 16-bits data indicating the amount of electrical angle to be controlled from a microprocessor; a re-load counter for incrementing a count for every 1/6 period of position detection signal and outputting the resultant data; and a ripple counter for receiving the resultant data and counting five times to stop the count of the re-load counter.

In still another preferred embodiment, the electrical angle control unit further includes a phase pattern generator to generate each position detection signal having an advanced electrical angle.

Briefly, in a brushless DC motor having a relatively large counter electromotive voltage, according to the present invention, a period of the apposition detection signal is controlled in such a way that a rectification phase angle, i.e., an electrical angle is advanced from the electrical angle of zero degrees during acceleration at the start of rotation thereby ensuring an acceleration characteristic of the motor and the electrical angle is returned to zero degrees during normal rotation. As a result of the above control, it is possible to ensure an acceleration characteristic at the start of rotation. Further, it is possible to ensure a small driving current of the motor so that it is possible to reduce power consumption of the motor.

The magnetic disc apparatus applying the present invention includes:

a spindle motor formed by a brushless DC motor having a relatively high counter electromotive voltage, and rotating a plurality of discs based on a predetermined rotational speed;

an electrical angle control system for controlling an electrical angle of drive current supplied to the spindle motor so as to advance from zero degrees during acceleration at the start of rotation and to return to zero degree during normal rotation;

a voice coil motor for moving a plurality of heads to predetermined position on the disc based on a position signal;

a rotational speed control unit for controlling the rotational speed of the spindle motor; and a position control unit for generating the position signal to control the position of the head on the disc to the predetermined position through the voice coil motor.

BRIEF DESCRIPTION OF THE DRAWINGS

In the drawings:

FIG. 13A and 13B are timing charts for position detection signals A, B and C to explain the embodiment shown in FIGS. 9A to 12.

DESCRIPTION OF THE PREFERRED EMBODIMENTS

Before describing the preferred embodiments, an explanation will be given of a basic structure of a brushless DC motor.

Figure 1:
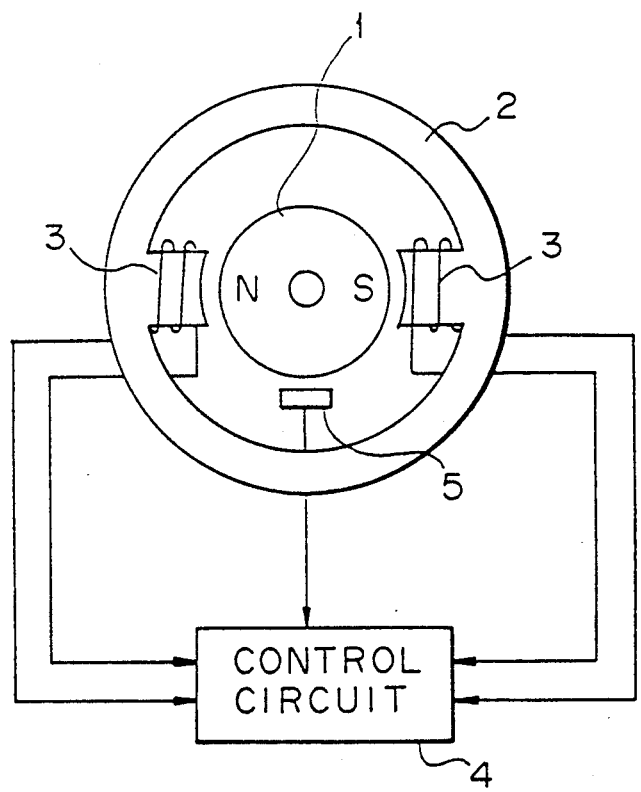
FIG. 1 is a basic structure of a brushless DC motor.

FIG. 1 is a basic structure of a brushless DC motor. Although this drawing shows a two-phase motor, a three-phase motor also has a similar structure. In FIG. 1, 1 denotes a rotor, 2 a stator, 3 a driving coil, 4 a control circuit, and 5 a hall element.

The rotor 1 is formed by a permanent magnet, and the driving coils 3 are provided for the stator 2 and connected to the control circuit 4. As is known, when a DC current is alternately supplied from the control circuit 4 to the driving coil 3, the rotor 1 starts to rotate in response to a magnetic repulsion force between the rotor and the stator. Further, the hall element 5 is provided for detecting a position of a magnetic pole of the rotor 1.

Figure 2:
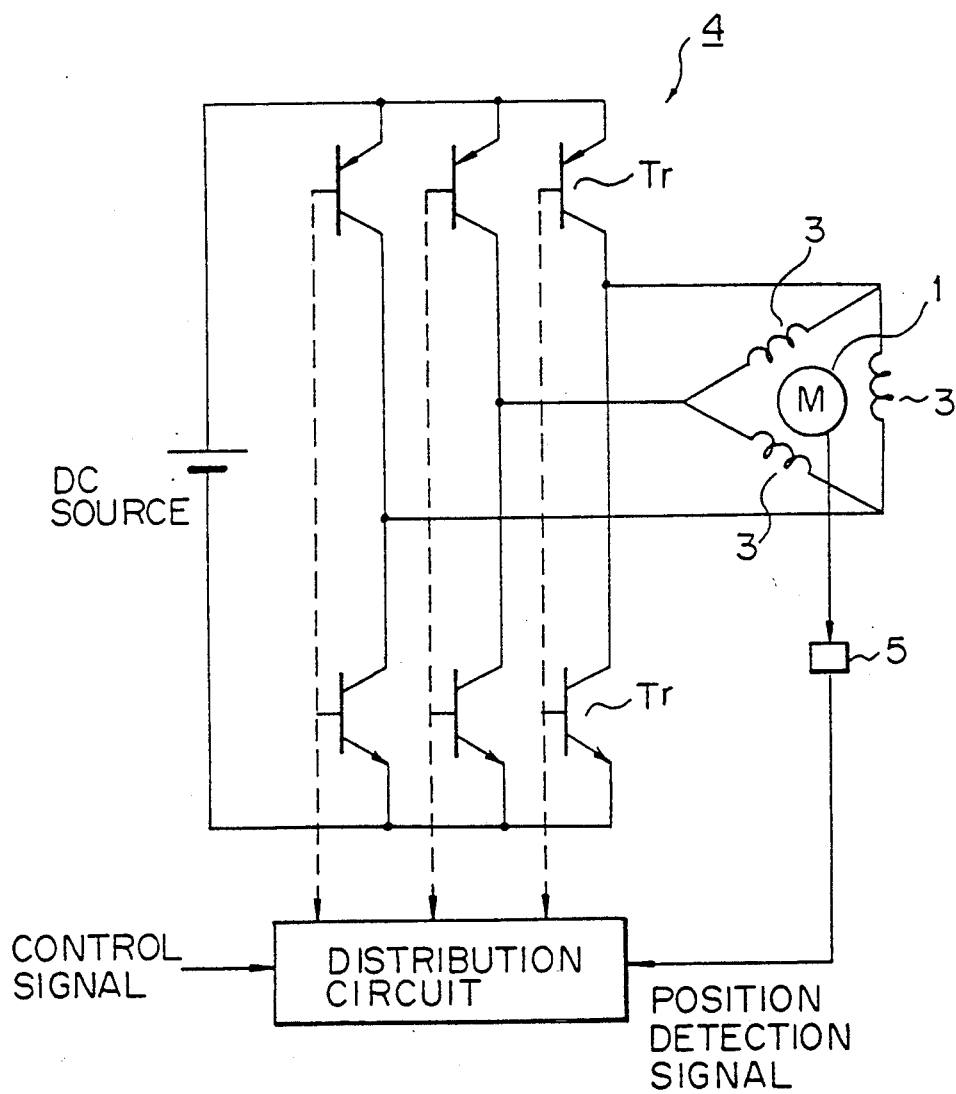
FIG. 2 is a detailed diagram of the control circuit shown in FIG. 1.

FIG. 2 is a detailed diagram of the control circuit shown in FIG. 1. In this case, the brushless DC motor is three-phase motor. In FIG. 2, DC denotes a direct current power source, and Tr denotes a switching transistor. As is known, when each transistor Tr is alternately turned ON/turned OFF in accordance with control of the distribution circuit, the DC current is alternately provided to the corresponding coil 3 so that the rotor 1 can be rotated under a magnetic repulsion force.

In the characteristic of the brushless DC motor, the driving current increases in the acceleration at the start of rotation so that power consumption also increases during acceleration. Further, the counter electromotive voltage occurs in each driving coil in the above state.

In general, there are two methods to ensure the acceleration characteristic at the start of rotation at low temperature. That is, the first method is to set the counter electromotive voltage to a lower value, and the second method is to supply the driving current to the coil in the lower counter electromotive voltage that can be obtained by moving the location of the hall element 5.

However, when carrying out the above first or second method to ensure the acceleration characteristic at the start of rotation at a low temperature, at a normal temperature, the rotational speed at no-load increases considerably and the power consumption also increases during the normal rotation of the motor.

Therefore, the primary object of the present invention is the reduction of power consumption of the brushless DC motor. Accordingly, the brushless DC motor having a relatively high counter electromotive voltage is utilized to achieve the above object. In this case, the higher the counter electromotive voltage, the smaller the driving current. As a result, it is possible to reduce the power consumption of a brushless DC motor. There is, however, a further problem in the above countermeasure. That is, the smaller the driving current, the worse the acceleration characteristic at the start of rotation.

Accordingly, in the present invention, to avoid deterioration of the acceleration characteristic at the start of rotation, the rectification phase angle, i.e., the electrical angle advances from zero degrees during acceleration to shift a supply timing of the driving current to the coil. As a result, it is possible to ensure the acceleration characteristic at the start of rotation.

Figure 3:
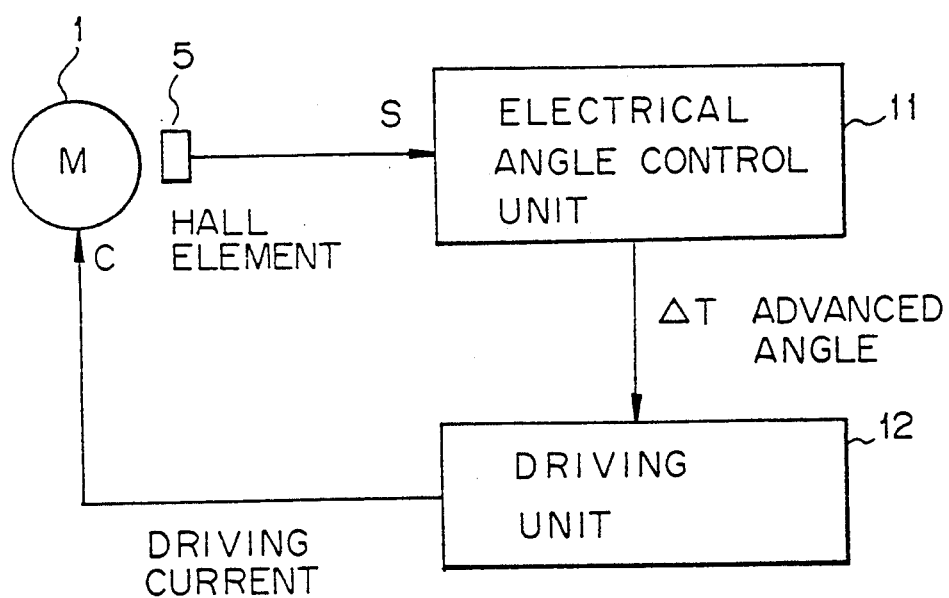
FIG. 3 is a basic block diagram applying the present invention.

FIG. 3 is a basic block diagram applying the present invention. The brushless DC motor M has a relatively large counter electromotive voltage. A positions detection signal S detected by the hall element 5 is applied to an electrical angle control means 11. The electrical angle control means 11 outputs position detection signals having a controlled electrical advanced angle $\Delta t$ to a driving means 12 to advance the electrical angle during rotation, and the driving means 12 applies the driving current C to the motor M in the supply timing of the advanced angle $\Delta t$. In the present invention, when the rotational speed reaches the normal state, the electrical angle is returned to zero degrees so that it is possible to reduce the power consumption because the counter electromotive voltage is high and the driving current is small.

Figure 4:
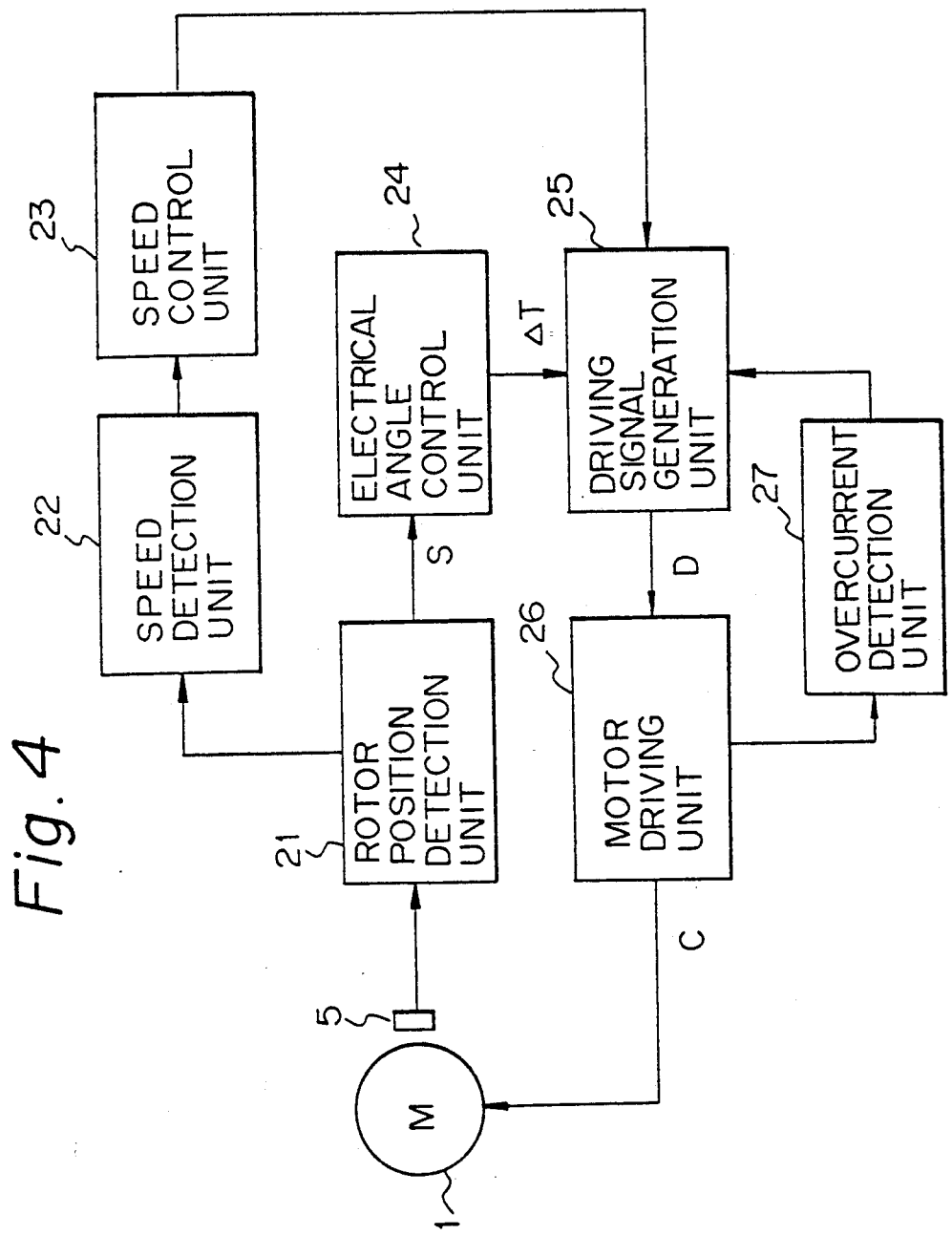
FIG. 4 is a detailed block diagram supplying the present invention.

FIG. 4 is a detailed block diagram applying the present invention. In FIG. 4, a rotor position detection unit 21 detects the position of the rotor 1, a speed detection unit 22 detects a rotational speed of the rotor 1, a speed control unit 23 controls the rotational speed, and an electrical angle control unit 24 controls the electrical angle based on the position detection signal S. Further, a driving signal generation unit 25 generates the motor driving signal D based on the electrical angle signal, the speed control signal, and the overcurrent signal. A motor driving unit 26 generates the driving current C, and an overcurrent detection unit 27 detects the overcurrent flowing the driving coil.

Figure 5:
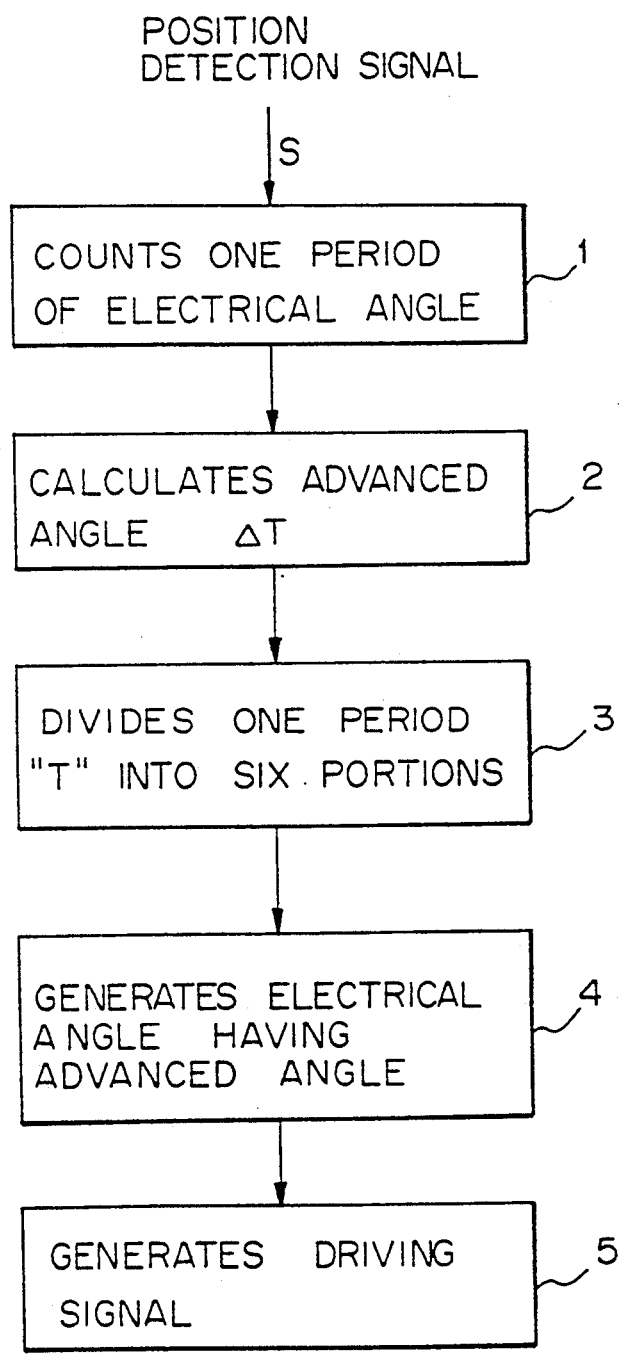
FIG. 5 is a basic flowchart explaining control of an electrical angle at the electrical angle control unit 24.
Figure 6:
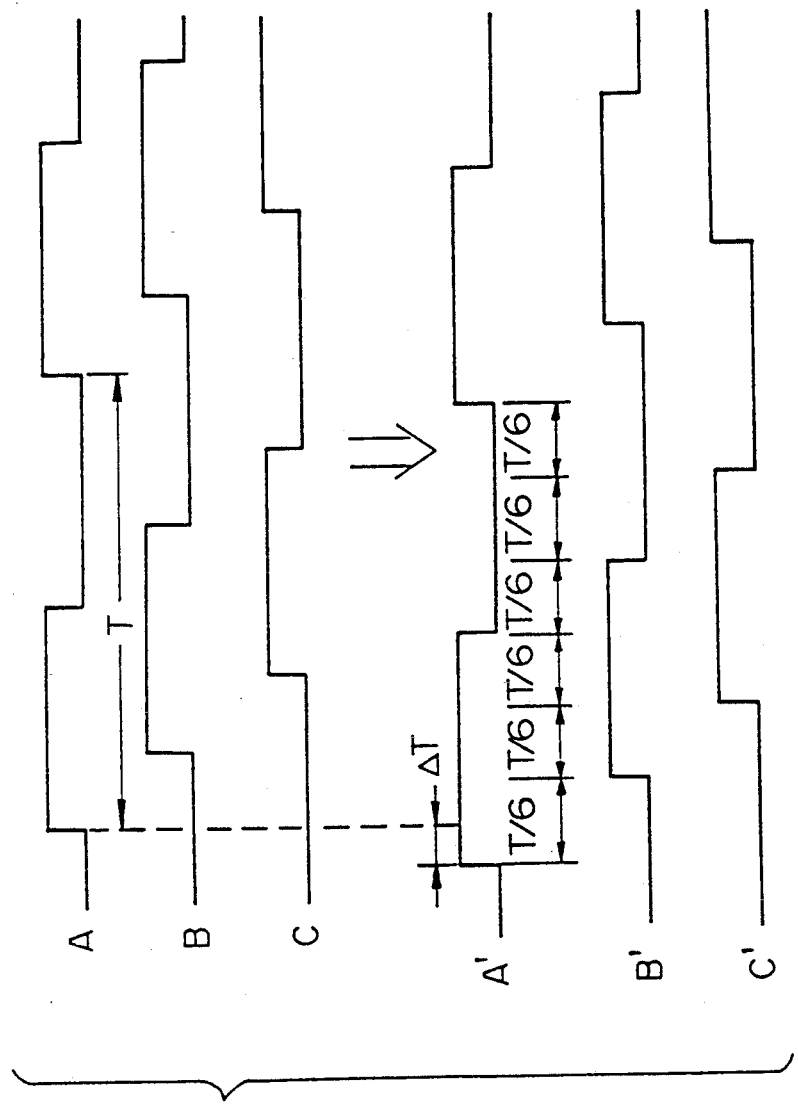
FIG. 6 is a basic timing chart of the driving current.

FIG. 5 is a basic flowchart explaining the control of an electrical angle at the electrical angle control unit 24, and FIG. 6 is a basic timing chart of the driving current. In step 1, when the electrical angle control unit 24 receives the position detection signal S from the rotor position detection unit 21, the electrical angle control unit 24 counts one period "T" of the position detection signal. In step 2, the electrical angle is replaced by micro-seconds to calculate the advanced angle. For example, when the electrical angle of one degree corresponds to one micro-second, one period (i.e., 360 degrees) of the electrical angle corresponds to 360 micro-seconds. Further, when the advanced angle $\Delta t$ is fifteen degrees it corresponds to fifteen micro-seconds. In step 3, one period T of the position detection signal is divided into six portions each having T/6. In step 4, the advanced angle is generated by a shift register as mentioned below. In step 5, the driving signal generation unit 25 generates the driving signal D to the motor based on the advanced angle.

In FIG. 6, reference characters A, B and C denote the position detection signals S from the rotor position detection unit 21. In this case, the positions detector (i.e., hall element) 5 is arranged in the most advantageous positions of the rotor to become the most preferable timing to obtain the most efficient operation of the motor during acceleration and normal rotation. As mentioned above, one period T corresponds to an electrical angle of 360 degrees so that "T/6" corresponds to a 60 degree electrical angle.

Reference characters A', B' and C' also denote the position detection signals shifted by the advanced angle Δt. Although the advanced angle Δt theoretically changes in the range of 0 to 60 degrees (not including a 0 or 60 degree angle), the most preferable advanced angle Δt is in the range of 15 to 30 degrees. In this range, it is possible to obtain the most preferable acceleration characteristic at the start of the rotation.

Further, the advanced angle Δt is determined from the leading edge of the position detection signal A so that it is possible to obtain the leading edge of the position detection signal A'. Accordingly, the leading edge of the position detection signal B' is determined after T/6 from the position detection signal A', and the leading edge of the position detection signal C' is determined after T/6 from the position detection signal B'.

Figure 7A:
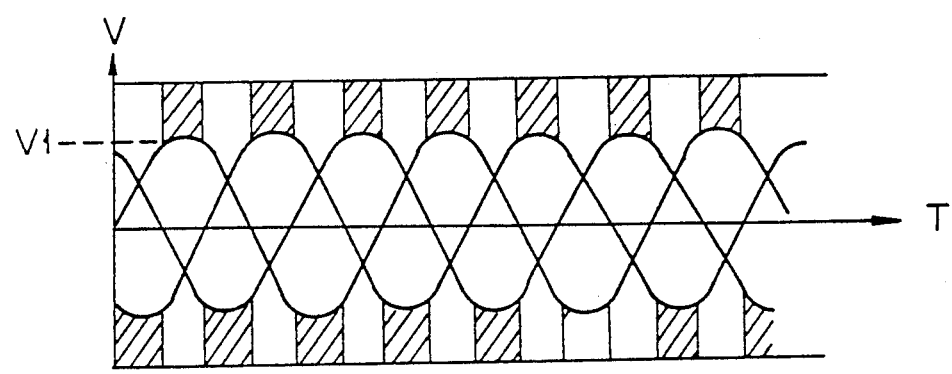
FIG. 7A is a view for explaining a counter electromotive voltage at the electrical angle of zero degrees in the three-phase DC motor.
Figure 7B:
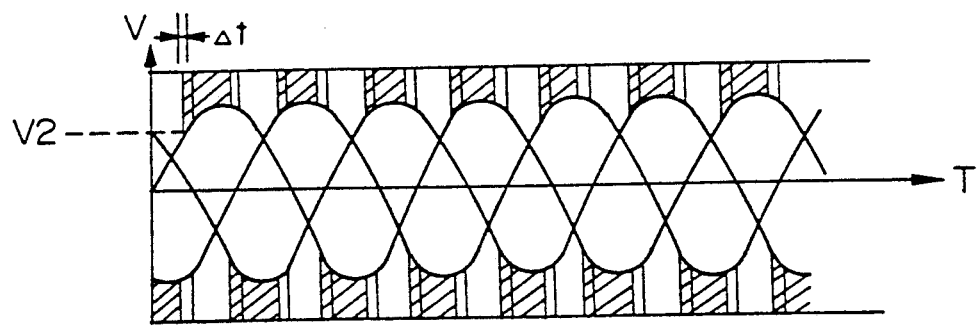
FIG. 7B is a view for explaining a counter electromotive voltage at an advanced electrical angle in the three-phase DC motor.

FIG. 7A is a view for explaining a counter electromotive voltage at an electrical angle of zero degrees in the three-phase DC motor, and FIG. 7B is a view explaining a counter electromotive voltage at an advanced electrical angle in the three-phase DC motor. In these drawings, the ordinate denotes the counter electromotive voltage and abscissa denotes time. The slanted line areas denote the motor driving current supplied to the driving coil.

In FIG. 7A, the motor starts to rotate when the counter electromotive voltage is V1. The voltage V1 corresponds to the start of the flow of the driving current to the coil. In FIG. 7B, the motor starts to rotate when the counter electromotive voltage is V2. The voltage V2 also corresponds to the start of the flow of the driving current having an advanced electrical angle. As is obvious from these drawings, the voltage V2 is smaller than the voltage V1.

As explained above, the smaller the counter electromotive voltage, the larger the driving current. Accordingly, the driving current in FIG. 7B becomes larger than that of FIG. 7A so that it is possible to improve the acceleration characteristic at the start of rotation.

The driving current flowing in the motor is expressed by the following formula. That is, $$V = Ra\ Ia + Ke\ N \quad (1)$$

Therefore, $$Ia = (V - Ke\ N)/Ra \quad (2).$$

Where, V is a supply voltage to a motor, Ia is a driving current to a coil, Ra is a winding resistance, Ke is a coefficient of a counter electromotive voltage, N is a rotational speed, and Ke N is a counter electromotive voltage.

As is obvious from the formula (2), the larger the counter electromotive voltage Ke N, the smaller the driving current Ia. As explained above, when the motor is driven by a high counter electromotive voltage at the electrical angle of zero degrees, the driving current to the motor becomes small so that it is possible to reduce power consumption. However, in this case, the acceleration characteristic at the start of rotation becomes worse because the driving current is small.

Accordingly, in the present invention, the electrical angle is advanced from zero degrees during acceleration at the start of the rotation so that it is possible to improve the acceleration characteristic because the counter electromotive voltage becomes smaller than zero degrees as shown in FIG. 7B.

As is obvious from the formula (1) and (2), it is necessary to raise the coefficient of the counter electromotive voltage Ke to produce a brushless DC motor having a high counter electromotive voltage. In this case, to raise the coefficient Ke, it is necessary to provide a permanent magnet having high magnetic energy as the rotor, or provide a winding having a large inductance as the stator.

Figure 8A:
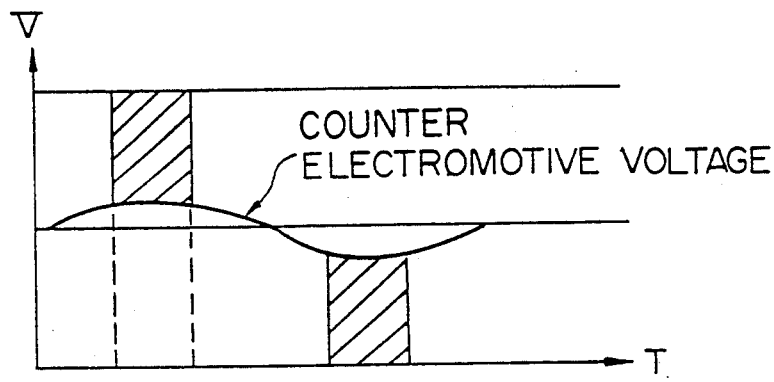
FIGS. 8A to 8C are detailed views explaining the relationship between the driving current (slanted portion) and the counter electromotive voltage.
Figure 8B:
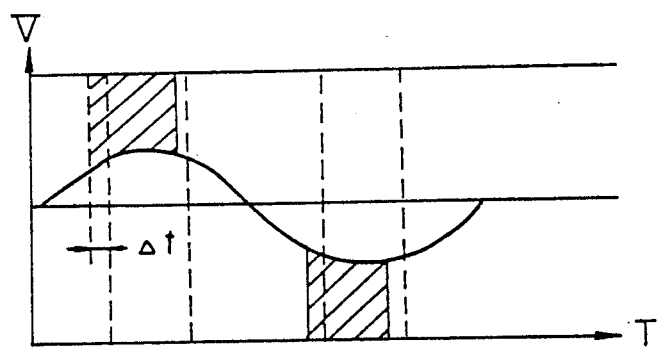
Figure 8C:
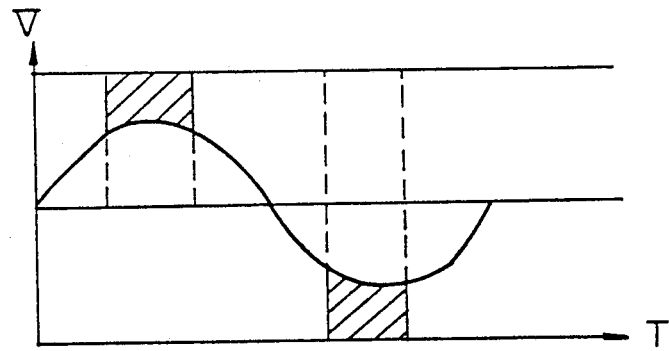

FIGS. 8A to 8C are detailed view explaining the relationship between the driving current (slanted line portion) and the counter electromotive voltage. In the drawing, FIG. 8A illustrates the state just after rotation. The electrical angle is not advanced in this state, since the rotational speed is small. The counter electromotive voltage (V) is also small because the counter electromotive voltage is given Ke N (Ke is a coefficiency of counter electromotive voltage, N is rotational speed).

FIG. 8B illustrates acceleration state. The timing of the electrical angle is advanced from zero degrees shown in FIG. 8A. In this case, since the electrical angle is advanced, the counter electromotive voltage becomes small.

FIG. 8C illustrates the normal rotation state. The electrical angle is returned to zero degrees during normal rotation.

Briefly, in a brushless DC motor having a relatively high counter electromotive voltage, in the present invention, the electrical angle is set to zero degrees during normal rotation so that it is possible to reduce power consumption because the driving current becomes small, and the electrical angle advances from zero degrees during acceleration at the start of rotation so that it is possible to ensure the acceleration characteristic at the start of the rotation.

Figure 9A:
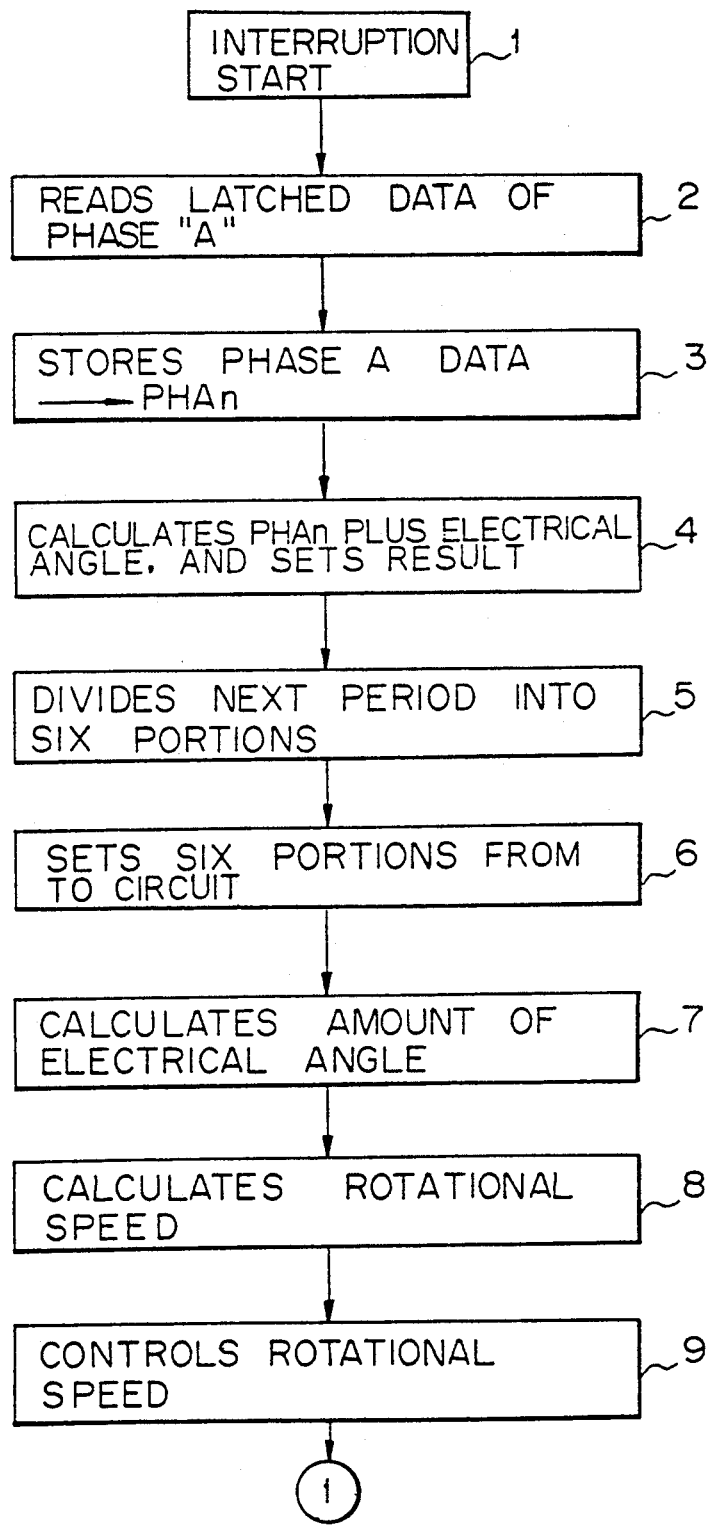
FIGS. 9A and 9B are flowcharts explaining the control of an electrical angle according to the present invention.
Figure 9B:
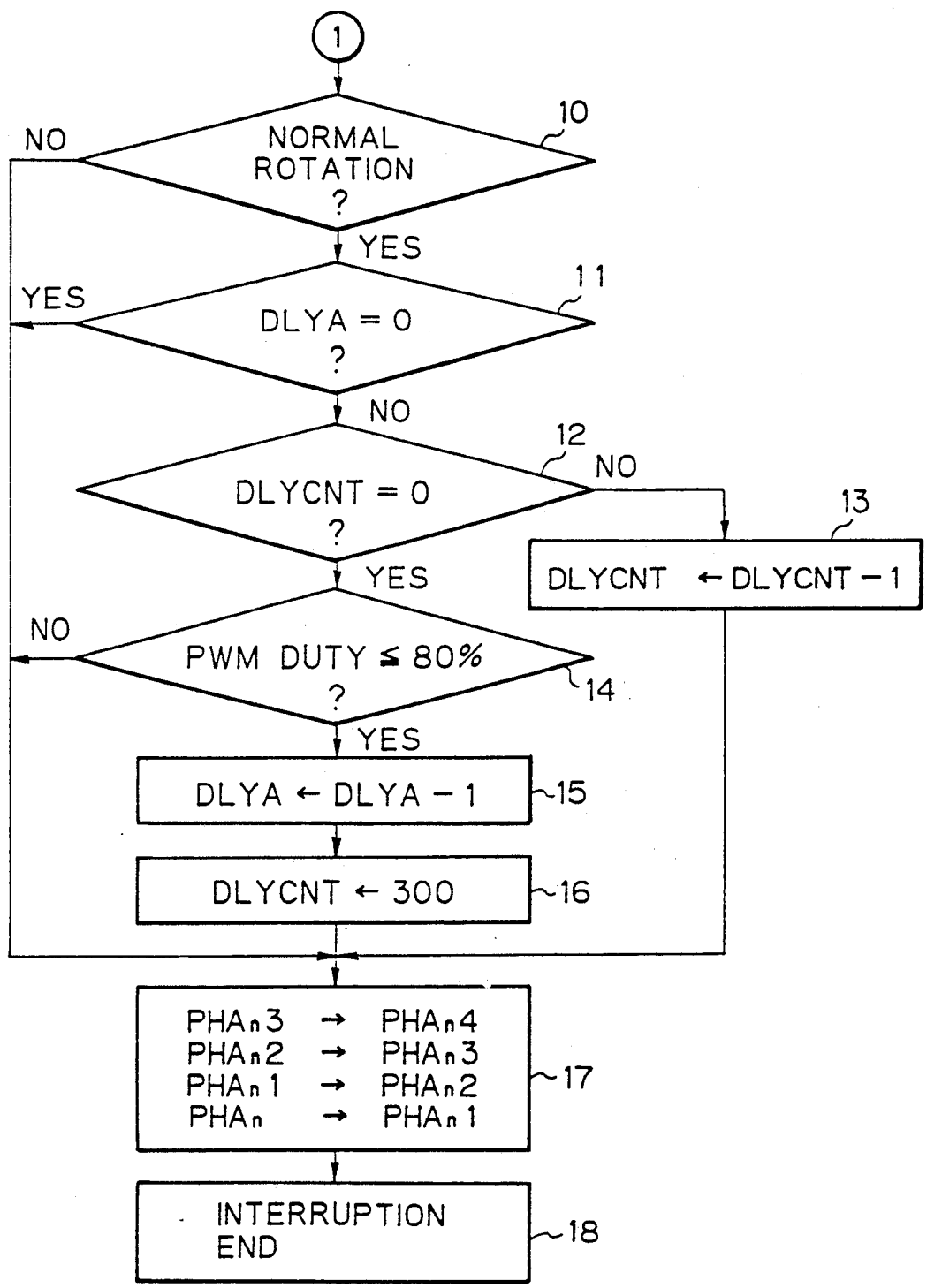

FIGS. 9A and 9B are flowcharts explaining a control of an electrical angle according to the present invention. The brushless DC motor has eight poles in this embodiment.

In step 1, an interruption process to the MPU (microprocessor shown in FIG. 10) is performed by the position detection signal A (below, phase A).

In step 2, the data of the phase A latched by the latch circuit 32 (see, FIG. 10) is read to the MPU.

In step 3, the data of the phase data A is stored in the MPU as the data PHAn.

Figure 10:
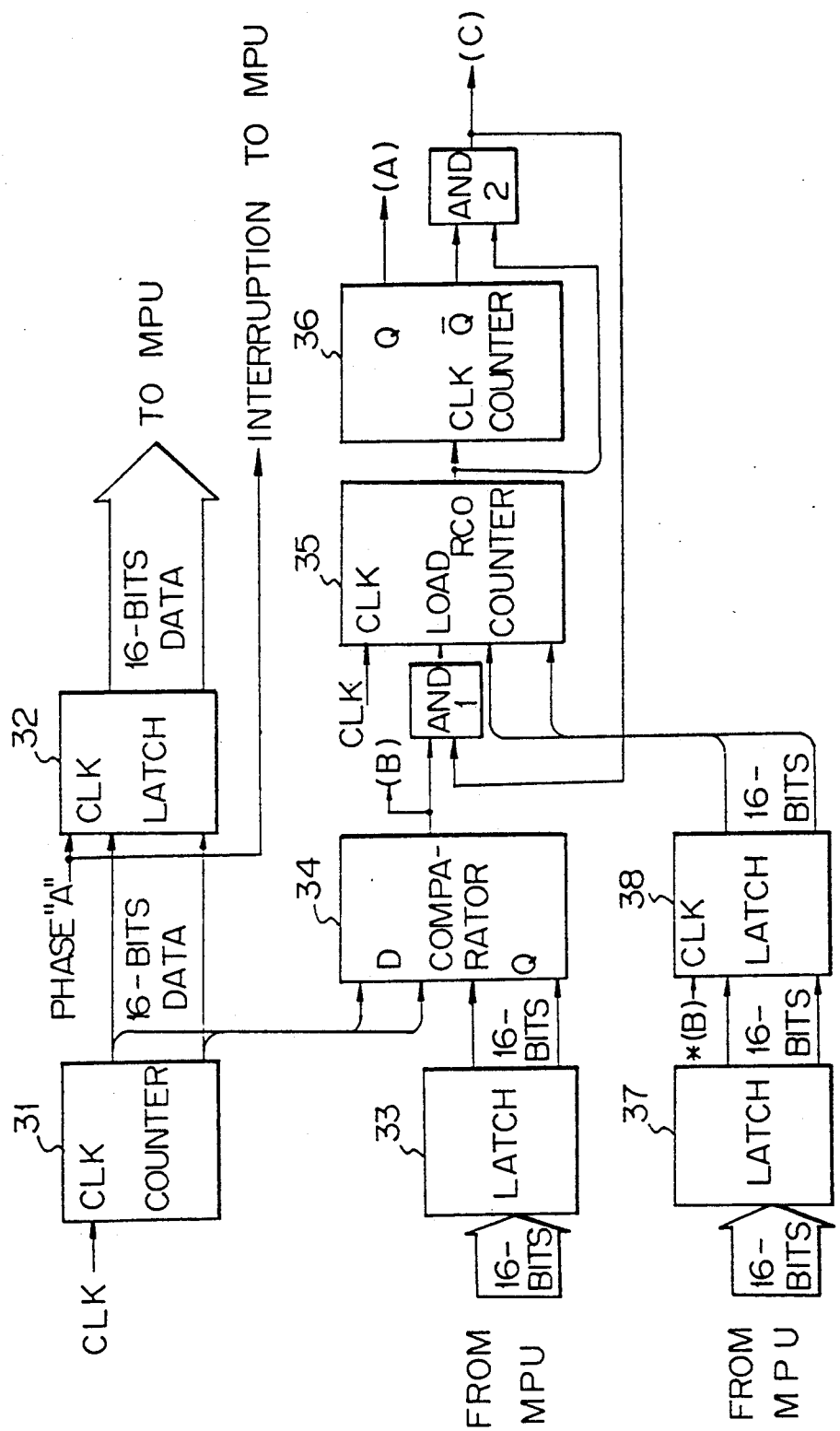
FIG. 10 is a detailed circuit diagram of the electrical angle control unit.

In step 4, the MPU calculates the data PHAn and the amount of electrical angle to be controlled (i.e., advanced angle), and the resultant data at the MPU is output to the latch circuit 33 (see, FIG. 10). In this case, the data before one rotation is used to calculate the electrical angle at the present stage.

In step 5, the period of the next phase receiving the next interruption is divided into six portions each having equal length.

In step 6, the above divided six portions are set to the circuit.

In step 7, the MPU calculates the amount of electrical angle, i.e., the advanced angle. As explained above, the advanced angle of the phase A is expressed by the time (μ second). Actually, the phase B' is calculated from the phase A.

In step 8, the rotational speed at he present time is calculated based on |PHAn−PHAn4| (see, FIG. 13A) since the motor rotates in four periods of phase A based on eight poles.

In step 9, the rotation speed is controlled by a pulse width modulation (PWM) at normal rotation.

In step 10, the MPU determines whether or not the rotation is normal.

In step 11, when the rotation is normal (YES, in step 10), the MPU determines whether or not the advanced angle (DLYA, initial value of DLY A is set to fifteen degrees) of the phase A is zero degrees.

In step 12, when the advanced angle (DLYA) of the phase A is not zero (NO, in step 11), the MPU determines whether or not the wait time for next decrement of DLYA (DLYCNT) is zero.

In step 13, when the count (DLYCNT) is not zero (NO, is step 12), the count (DLYCNT) is decremented.

In step 14, when the count (DLYCNT) is zero (YES, in step 12), the MPU determines whether or not the duty ratio of the PWM is equal to or smaller than 80%, because the advanced angle is controlled by the duty ratio of the PWM.

In step 15, the advanced angle is subtracted every minus one degree.

In step 16, the count DLYCNT is set to 300.

In step 17, when the rotation is not normal (NO, in step 10), the check is determined whether or not the advanced angle (DLYA) is zero (YES, in step 11), and the following four data based on the interruption of the phase A are stored in the memory, |PHAn3−PHAn4|, |PHAn2−PHAn3|, |PHAn1−PHAn2|, and |PHAn−PHAn1|.

In step 18, the interruption process is completed in the electrical angle control unit.

FIG. 10 is a detailed circuit diagram of the electrical angle control unit. In FIG. 10, reference number 31 denotes a 16 bit free run counter, reference numbers 32, 33, 37 and 38 denote 16-bits data length circuits, 34 denotes a 16-bits comparator, 35 denotes a re-load counter, and 36 denotes a ripple (RCO) counter. Further, MPU denotes a microprocessor.

The 16-bits free run counter 31 counts clocks CLK every one micro second (1 μs) from "0000" to "ffff" as 16-bits data, and these 16-bits data are latched by the 16-bits data latch circuit 32. When the phase A is input to the 16-bits data latch circuit 32, these 16-bits data are transferred to the MPU. The phase A is used as the interruption to the MPU.

The MPU outputs the amount of electrical angle to be controlled to the 16-bits comparator 34 through the 16-bits data latch circuit 33. Further, the 16-bits data are input parallel from the 16-bits free run counter 31 to the 16-bits comparator 34. The 16-bits comparator 34 outputs the resultant signal (B) when the 16-bits data from the free run counter 31 is equal to the 16-bits data from the MPU. This resultant signal (B) indicates the start of the phase B'.

The signal (B) is input to the re-load counter 35 through the AND1 gate. In this case, the AND1 gate receives the signal (C) from the AND2 gate in the other input terminal thereof. The re-load counter 35 receives the clock signal CLK, the output of the AND1 gate, and 16-bits data from the 16-bits data latch circuit 38. Further, the re-load counter 35 outputs the resultant data to the ripple counter (RCO) 36 for every 1/6 period of the phase A.

The ripple counter 36 receives the resultant data from the re-load counter 35 and counts the resultant data until five counts, and after five counts, the re-load counter 5 is stopped. The Q terminal of the ripple counter 36 outputs the signal (A), and the inverted Q terminal outputs the signal (C) through the AND2 gate.

Further, the MPU outputs a 1/6 period signal of the phase A to the 16-bits latch circuit 37. These 16-bits data are output to the re-load counter 35 through the 16-bit latch circuit 38.

Figure 11:
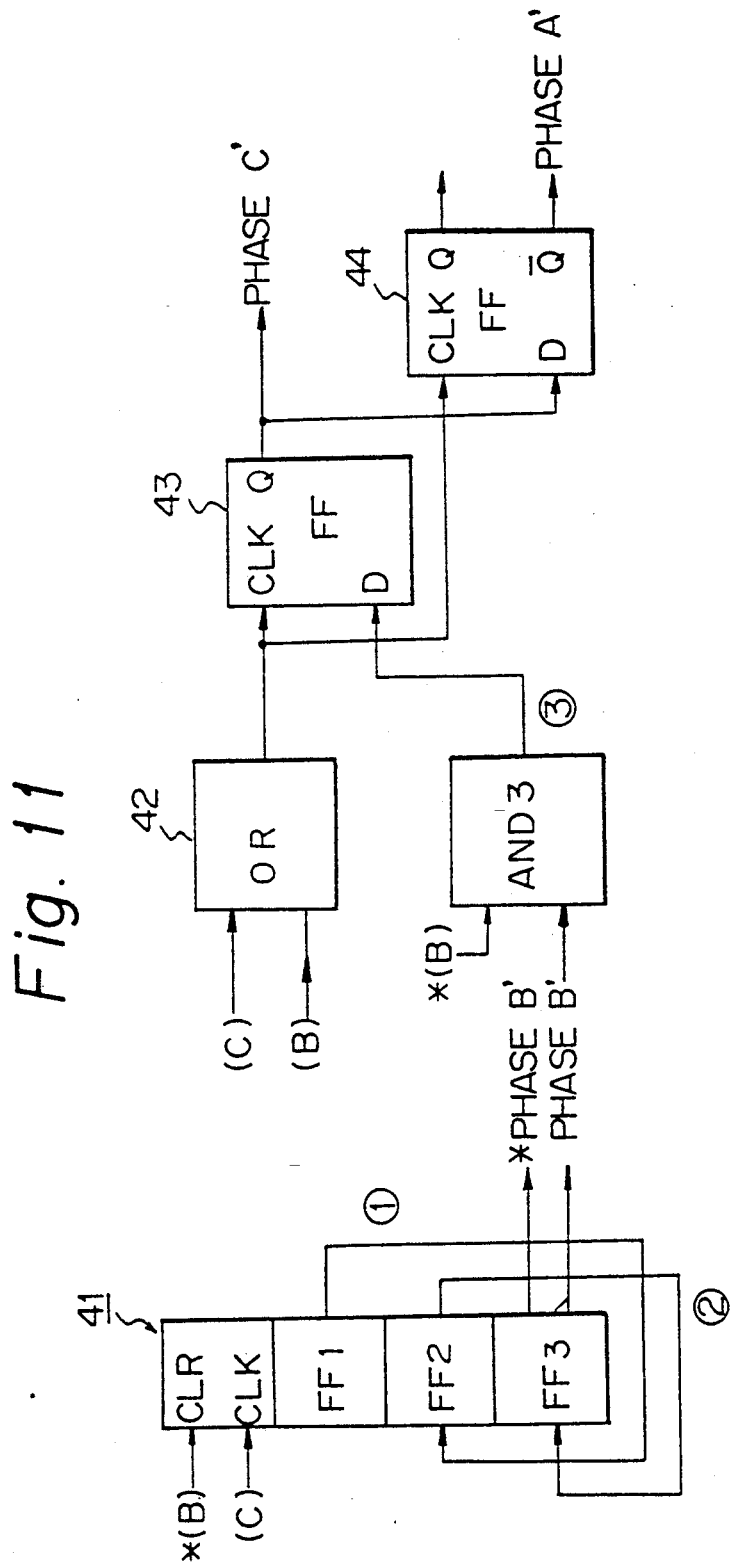
FIG. 11 is a detailed block diagram of a phase pattern generator.
Figure 12:
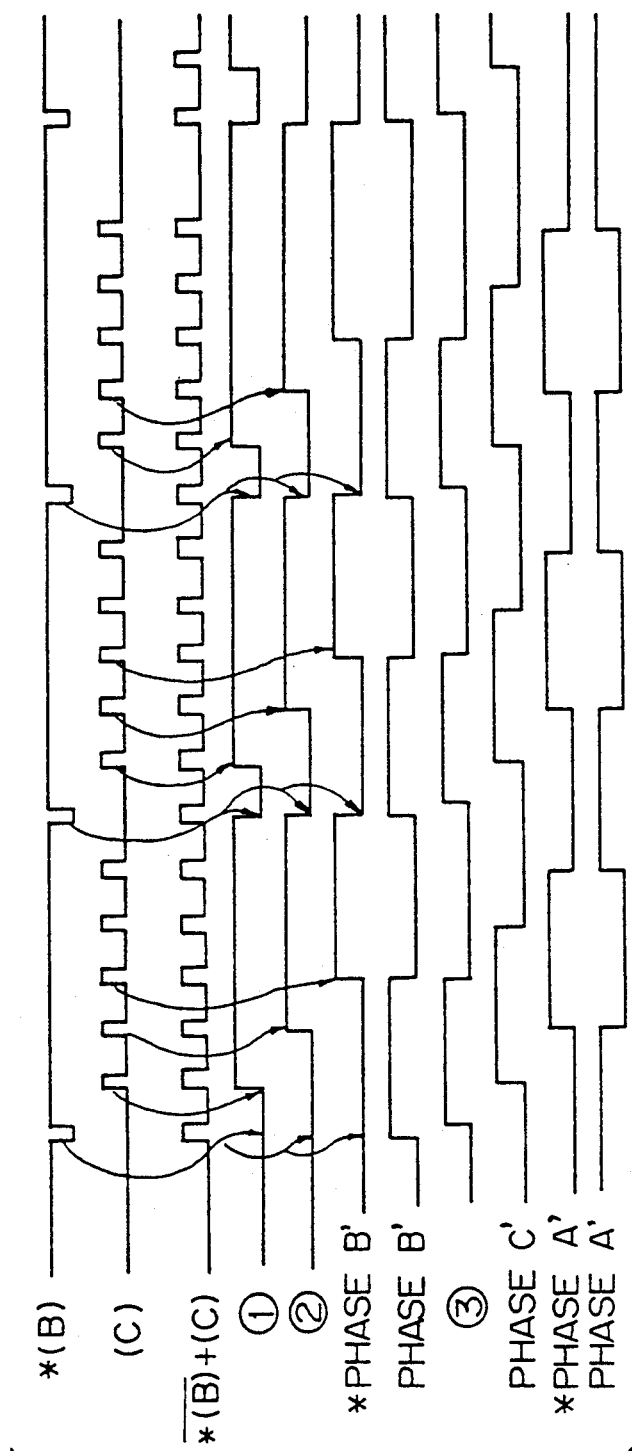
FIG. 12 is a timing chart of the diagram shown in FIGS. 10 and 11.

FIG. 11 is a detailed block diagram of a phase pattern generator, and FIG. 12 is a timing chart of the diagram shown in FIG. 11. The operation of this circuit is explained in detail with reference to the timing chart of FIG. 12.

Reference numbers 41, 43 and 44 denote flip-flop circuits. Reference number 42 denotes an OR circuit. The flip-flop circuit 41 has three flip-flop units FF1 to FF3. The FF1 receives the inverted signal (B) and the signal (C) from the AND2 gate. The FF1 outputs the signal (1) to the FF2, and the FF2 outputs the signal (2) to the FF3. The FF3 outputs the phase B' and the inverted phase B'. Further, the OR circuit 42 performs the OR operation to signal (B) and the signal (C), and the result is input to the flip-flop 43. The inverted signal (B) and the phase B' are input to the flip-flop 43. The flip-flop 43 outputs the phase C'. Further, the flip-flop 44 receives the phase C' and the result of the adder 42, and outputs the phase A'.

Figure 13B:
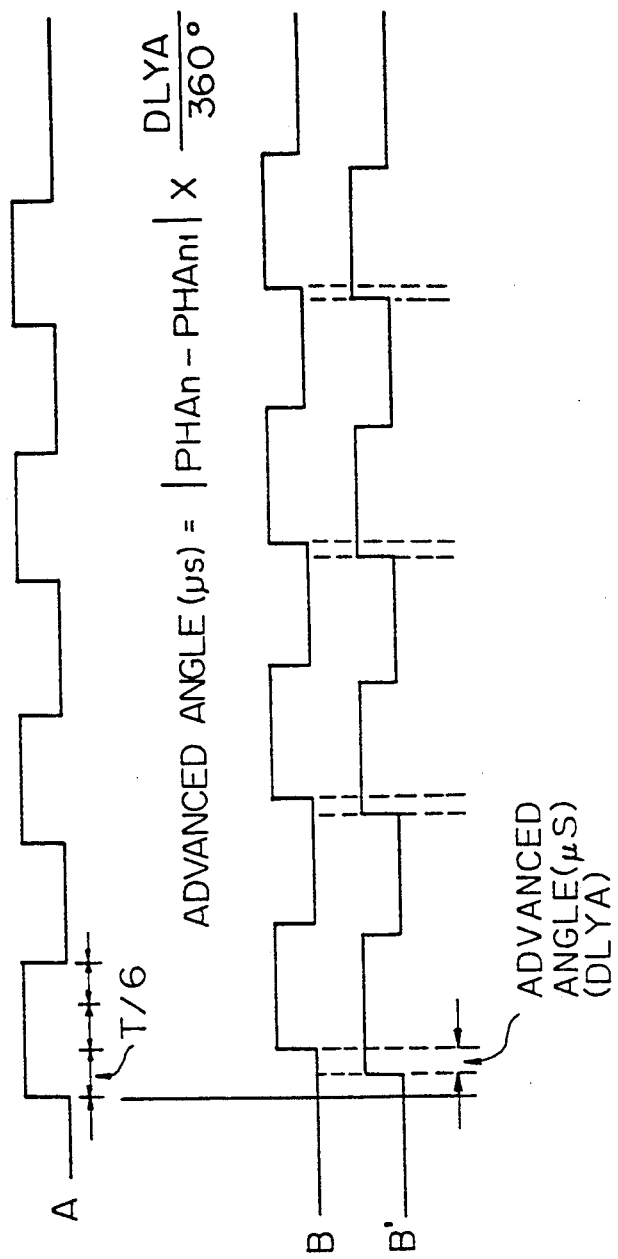

FIGS. 13A and 13B are timing charts for position detection signals A, B and C to explain the embodiment shown in FIGS. 9A to 12. FIG. 13A is the case of an electrical angle of zero degrees and FIG. 13B is the case of an advanced angle DLYA. In FIG. 13A, PHAn to PHAn4 denote the interruption pulse to the MPU, and these interruption pulses are generated for every one period of the phase A. As is obvious from the timing chart, one period of the phase A can be expressed by |PHAn−PHAn1|, ---, |PHAn3−PHAn4|. Since the motor has eight poles in this embodiment, four periods of the phase A indicate one rotation of the motor.

In FIG. 13B, the advanced angle (μs) can be expressed by the following formula.

advanced angle
(μs)=(|PHAn−PHAn1|)×DLY/360°.

The phase B' is a new position detection signal advanced by the amount of "DLYA".

Figure 14:
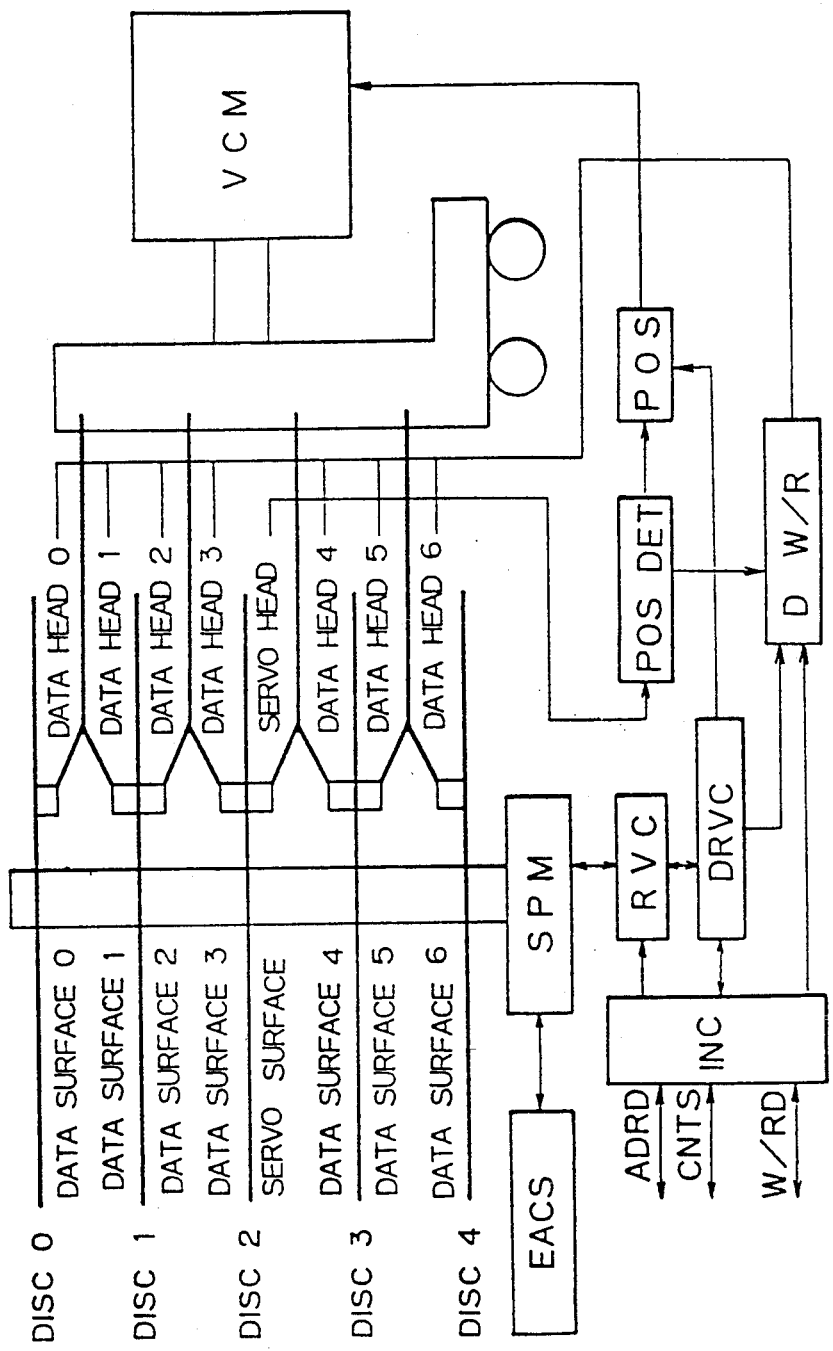
FIG. 14 is a schematic block diagram of a magnetic disc apparatus applying the present invention.

FIG. 14 is a schematic block diagram of a magnetic disc apparatus applying the present invention. In FIG. 14, the magnetic disc apparatus has, for example, five magnetic discs 0 to 4. These discs are rotated by a spindle motor SPM. In general, the spindle motor SPM is formed by the brushless DC motor having a relatively high counter electromotive voltage. The rotational speed of the spindle motor SPM is controlled by a rotation control circuit RVC which receives write/read data W/RD, a control signal CNTS, and address data ADRD from a controller (not shown). The data are written on data surfaces of the disc, and the written data are read by the data heads 0 to 6 through a data write/read circuit D-W/R. Further, when the servo data on the disc are read by a servo head, they are demodulated by a position detection circuit POS-DET. The resultant data of the circuit POS-DET is output to a position control circuit POS for positioning the data head. The resultant data of the position control circuit POS is output to a voice coil motor VCM so that the data head is positioned by the VCM through a postioner.

EACS denotes the electrical angle control system according to the present invention. The electrical angle control system EACS controls the electrical angle of drive current supplied to the spindle motor so as to advance from zero degrees during acceleration at the start of rotation and to return to zero degree during normal rotation. Since the detailed structure is shown by FIG. 4, the explanation of this system is omitted.

I claim:

1. A magnetic disc apparatus, comprising:
    a spindle motor formed by a brushless DC motor having a relatively high counter electromotive voltage, and rotating a plurality of discs based on a predetermined rotational speed;
    an electrical angle control system for controlling an electrical angle of drive current supplied to the spindle motor so as to advance from zero degrees during acceleration at the start of rotation and to return to zero degree during normal rotation;
    a voice coil motor for moving a plurality of heads to predetermined position on the disc based on a position signal;
    a rotational speed control unit for controlling the rotational speed of the spindle motor; and
    a position control unit for generating the position signal to control the position of the head on the disc to the predetermined position through the voice coil motor.

2. An electrical angle control system for a brushless DC motor having a relatively high counter electromotive voltage, the system being provided in a magnetic disk apparatus at least having a spindle motor, a voice coil motor, a rotational speed control unit, and a position control unit, the system comprising:
    rotor position detection means mounted to the spindle motor for detecting the rotor position and generating a position detection signal;
    electrical angle control means receiving the position detection signal, and controlling a period of the position detection signal in such a way that the electrical angle is advanced from an electrical angle of zero degrees during acceleration at the start of rotation to ensure an acceleration characteristic of the motor, and the electrical angle is returned to an electrical angle of zero degrees during normal rotation to ensure a small driving current and reduce power consumption of the motor; and
    driving means receiving position detection signals each having an electrical angle controlled by the electrical angle control means, and outputting the driving current to the motor.

3. An electrical angle control system as claimed in claim 2, wherein the electrical angle control means further controls the electrical angle in such a way that, first, the electrical angle is not advanced just after the start of rotation, then, the electrical angle is advanced from zero degrees until the rotation becomes normal, and finally, the electrical angle is returned to zero degrees in the normal rotation.

4. An electrical angle control system as claimed in claim 2, wherein the electrical angle control means comprises:
    a 16-bits free run counter receiving clocks having a one micro-second period, counting the clocks and outputting 16-bits data from "0000" to "ffff";
    16-bits data latch circuits for latching the 16-bits data;
    a 16-bits comparator for comparing the 16-bits data from the free run counter with 16-bits data indicating the amount of electrical angle to be controlled from a microprocessor;
    a re-load counter for incrementing a count for every 1/6 period of a position detection signal and outputting the resultant data; and
    a ripple counter for receiving the resultant data and counting five times and stopping the count of the reload counter.

5. An electrical angle control system as claimed in claim 4, wherein the electrical angle control means further comprises a phase pattern generator to generate each position detection signal having an advanced electrical angle.

6. A magnetic disc apparatus, comprising:
    a spindle motor formed by a brushless DC motor having a relatively high counter electromotive voltage, and rotating a plurality of discs based on a predetermined rotational speed;
    an electrical angle control system for controlling an electrical angle of drive current supplied to the spindle motor so as to advance from zero degrees during acceleration at the start of rotation and to return to zero degree during normal rotation;
    a voice coil motor for moving a plurality of heads to a predetermined position on the disc based on a position signal;
    a rotational speed control unit for controlling the rotational speed of the spindle motor; and
    a position control unit for generating the position signal to control the position of the head on the disk to the predetermined position through the voice coil motor,
    the electrical angle control system including:
        rotor position detection means mounted to the spindle motor for detecting the rotor position and generating a position detection signal;
        electrical angle control means receiving the position detection signal, and controlling a period of the position detection signal in such a way that the electrical angle is advanced from an electrical angle of zero degrees during acceleration at the start of rotation to ensure an acceleration characteristic of the motor, and the electrical angle is returned to an electrical angle of zero degrees during normal rotation to ensure a small driving current and reduce power consumption of the motor; and
        driving means receiving position detection signals each having an electrical angle controlled by the electrical angle control means, and outputting the driving current to the motor.

7. A magnetic disc apparatus as claimed in claim 6, wherein the electrical angle control means further controls the electrical angle in such a way that, first, the electrical angle is not advanced just after the start of rotation, then, the electrical angle is advanced from zero degrees until the rotation becomes normal, and finally, the electrical angle is returned to zero degrees in the normal rotation.

8. A magnetic disc apparatus as claimed in claim 7, wherein the electrical angle control means comprises:

a 16-bits free run counter receiving clocks having a one micro-second period, counting the clocks and outputting 16-bits data from "0000" to "ffff":

16-bits data latch circuits for latching the 16-bits data;

a 16-bits comparator for comparing the 16-bits data from the free run counter with 16-bits data indicating the amount of electrical angle to be controlled from a microprocessor;

a re-load counter for incrementing a count for every 1/6 period of a position detection signal and outputting the resultant data; and a ripple counter for receiving the resultant data and counting five times and stopping the count of the reload counter.

9. A magnetic disc apparatus as claimed in claim 8, wherein the electrical angle control means further comprises a phase pattern generator to generate each position detection signal having an advanced electrical angle.

* * * * *

UNITED STATES PATENT AND TRADEMARK OFFICE
CERTIFICATE OF CORRECTION

PATENT NO. : 5,298,839
DATED     : March 29, 1994
INVENTOR(S) : Kazunori Takeda

It is certified that error appears in the above-indentified patent and that said Letters Patent is hereby corrected as shown below:

On the title page:

Item 30 (Foreign Application Priority Data), delete "3-35425", and insert --3-55425--.

Column 7, line 4, delete "he" and insert --the--.

Signed and Sealed this

Twenty-fourth Day of January, 1995

*Attest:*

BRUCE LEHMAN

*Attesting Officer*    *Commissioner of Patents and Trademarks*